US007613130B2

(12) United States Patent
Huang

(10) Patent No.: US 7,613,130 B2
(45) Date of Patent: Nov. 3, 2009

(54) METHOD FOR DETERMINING THE RELATIONSHIP OF A CUSTOMER EDGE ROUTER WITH VIRTUAL PRIVATE NETWORK

(75) Inventor: Bin Huang, Guangdong (CN)

(73) Assignee: Huawei Technologies Co., Ltd., Shenzen (CN)

( * ) Notice: Subject to any disclaimer, the term of this patent is extended or adjusted under 35 U.S.C. 154(b) by 685 days.

(21) Appl. No.: 11/184,727

(22) Filed: Jul. 19, 2005

(65) Prior Publication Data

US 2005/0286441 A1 Dec. 29, 2005

Related U.S. Application Data

(63) Continuation of application No. PCT/CN2004/000067, filed on Jan. 18, 2004.

(30) Foreign Application Priority Data

Jan. 22, 2003 (CN) .............................. 03 1 00809

(51) Int. Cl.
*H04L 12/28* (2006.01)
(52) U.S. Cl. .................... 370/254; 370/395.31; 370/351
(58) Field of Classification Search ................ 370/254, 370/389, 395, 423, 422
See application file for complete search history.

(56) References Cited

U.S. PATENT DOCUMENTS

| 7,046,662 | B1 * | 5/2006 | Saluja et al. | ................. | 370/389 |
| 7,450,505 | B2 * | 11/2008 | Buchanan et al. | ........... | 370/231 |
| 2004/0025054 | A1 | 2/2004 | Xue | | |

FOREIGN PATENT DOCUMENTS

JP       JP 200220894 A       7/2002

(Continued)

OTHER PUBLICATIONS

Eric C. Rosen and Yakov Rekhter:"BGP/MPLS VPNs", Cisco System Inc, Mar. 1999, p. 1-24.*

(Continued)

*Primary Examiner*—Dang T Ton
*Assistant Examiner*—Pamit Kaur

(57) ABSTRACT

This invention discloses a method for determining the relationship of a Customer Edge Router (CE) with a Virtual Private Networking (VPN), which comprises: assigning in advance for each CE device at least one Route Target (RT) value to form the RT table of the CE, creating CE Route Communities (CERC) in the network management and assigning for each created CERC a Hub RT value and a Spoke RT value. The method further comprises: dividing the RT table of the current CE to be matched with a CERC into an import RT table and an export RT table according to the import/export attributes of the RT values, and determining whether the CE belongs to the designated CERC and whether the CE is a Hub CE or a Spoke CE in the CERC according to the RT values in the import RT table and export RT table obtained as well as the Hub RT value and Spoke RT value assigned to the designated CERC. With the method, the relationship between a CE and a CERC as well as the type of the CE in the CERC can be learned by a reverse deduction based on the RT tables known on the network so that VPN information can learn from the network management. Accordingly, less human effort is involved and cost of network maintenance greatly decreased.

3 Claims, 4 Drawing Sheets

FOREIGN PATENT DOCUMENTS

| | | |
|---|---|---|
| WO | WO 02076029 A | 9/2002 |
| WO | 02/099571 A2 | 12/2002 |

OTHER PUBLICATIONS

Semeria, C: "RFC 2547bis: BGP/MPLS VPN Fundamentals"; Juniper Networks, 2001, pp. 1-38.*

Semeria, C: "RFC 2547bis: BGP/MPLS VPN Fundamentals"; Whitepaper Juniper Networks, XX, XX, [Online] 2001, pp. 1-38, XP002994705; Retrieved from the Internet: URL:http://www.juniper.net/solutions/literature/white_papers/200012.pdf>.

Rosen, E., et al.: "RFC 2547 BGP/MPLS VPNs" IETF; Mar. 1999; pp. 1-25; XP002255256; Internet.

* cited by examiner

METHOD FOR DETERMINING THE RELATIONSHIP OF A CUSTOMER EDGE ROUTER WITH VIRTUAL PRIVATE NETWORK

CROSS-REFERENCE TO RELATED APPLICATIONS

This application is a continuation of International Application No. PCT/CN2004/000067, filed on Jan. 18, 2004. This application claims the benefit of Chinese Application No. 03100809.7, filed on Jan. 22, 2003. The disclosures of the above applications are incorporated herein by reference.

FIELD OF THE INVENTION

The present invention relates to the field of Virtual Private Network (VPN), more specifically, to a method for determining the relationship of a customer edge router with a BGP/MPLS VPN.

BACKGROUND OF THE INVENTION

RFC 2547 bis, a standard issued by Internet Engineering Task Force (IETF), defines a VPN model, where the network comprises the Service Provider's backbone (common network) and customer sites where a VPN is a set of sites. The main functionality of the VPN is to construct a private network by using the resources of a common network, and the common network guarantees the security and privacy of the private network. Since the VPN of this model is mostly implemented with the MPLS (Multiple Protocol Label Switching) and BGP (Border Gateway Protocol), therefore it is called BGP/MPLS VPN.

As shown in FIG. 1, in a BGP/MPLS VPN, customer sites access to the backbone through Customer Edge Routers (CE), and the backbone connects with CEs through Provider Edge Routers (PE). PE and CE exchange route information with each other. CE issues the route information of its own site to the connected PE, and obtains the route information of other sites in the VPN from the said PE.

The VPN Routing and Forwarding (VRF) table implements route information exchange between a PE and a CE. Every CE is associated with a logically different VRF on the PE to which the CE is connected; the PE stores route information that has been obtained from a CE in the VRF associated with the said CE, and transfers other route information in the associated VRF to the CE. Meanwhile different PEs exchange route information with each other in their VRFs: a PE transfers its VRF route information to other PEs, and stores route information from other PEs in its own VRFs.

Now refer to FIG. 1, customer A leases a VPN with two sites from the service provider: Site1 and Site2, which access the provider network through CE1 and CE2, respectively. PE1 and PE2 are access devices of the provider network for CE1 and CE2, respectively, and PE1 has assigned VRF1 to CE1 while PE2 has assigned VRF2 to CE2. During routing information exchange between PE1 and CE1, PE1 stores the routing information learned from CE1 in VRF1 while CE1 learns routing information from VRF1. Similarly, during the routing information exchange between PE2 and CE2, PE2 stores the routing information learned from CE2 in VRF2 while CE2 learns routing information from VRF2. During the routing information exchange between PE1 and PE2, PE2 stores the routing information learned from VRF1 in VRF2 while PE1 stores the routing information learned from VRF2 in VRF1. In this way, CE1 and CE2 exchange their routing information through the provider network, thereby the VPN is created.

In practice, a network may have a plurality of customers and VPNs, so it is necessary to control exchange of routing information between VRFs. As shown in FIG. 2, two customers, customer A and customer B, lease VPN A and VPN B, respectively, from the service provider, and the networking of VPN A is the same as that shown in FIG. 1. For VPN B, Site B-1 of customer B accesses VPN B through CE-B1, which accesses the provider network through PE3. PE3 has assigned VRF3 to CE-B1. In this case, since VRF3 does not belong to the VPN which VRF1 and VRF2 belongs to, VRF3 should not learn about the routing information transferred from VRF1 and VRF2. This means that during routing information exchange between PEs, a method is needed to prevent information exchange between VRFs of different VPNs.

In a BGP/MPLS VPN, a Route Target (RT) attribute is used to solve the above problem. Each VRF has one or more RT attributes, and the RT attributes are classified into two types: the import type and the export type. A VRF may define arbitrarily that an RT is of the import type or export type. When issuing the routing information on a network, a VRF appends its own export RT value to the routing information. When another PE receives the routing information, it will check whether the import RT value in one of its VRFs equals to the appended export RT value; if so, the PE will insert the routing information in the said VRF.

As shown in FIG. 3, the network of FIG. 2 has assigned for VRF1 two RT values: import 100:1 and export 100:2. The former RT shows it is of the import type with a value 100:1, and the latter RT shows it is of the export type with a value 100:2. When PE1 issues the routing information of VRF1, the export RT value 100:2 of VRF1 is appended. Upon receiving the routing information of VRF1, PE2 finds that the appended RT value 100:2 equals to the import RT value 100:2 of its own VRF2, so PE2 inserts the routing information of VRF1 in VRF2. Since there is no import RT value in VRF3 on PE3 that is equal to the export RT value of 100:2, the routing information of VRF1 will not be inserted in VRF3 on PE3. In this way, it is guaranteed that there is no routing information exchanging between VRFs of different VPNs.

It is seen from the above description that CE1 and CE2 contain each other's routing information. That is, CE1 and CE2 are connected to each other, and as each site accesses the provider network through its own CE, for the reason of simplicity, no differentiation is hereinafter made between CEs and sites.

It is seen from FIG. 3 that RT values determine the connections between CEs. All connections between CEs can be obtained if all RT values in the network are known. One important function of the network manager of the BGP/MPLS VPN is to assign RT attribute values in accordance with the configuration of VPN. With the RT attribute values, connections between CEs can be identified, i.e. it can be determined which VPN a CE belongs to.

The simplest approach for assigning RT is: when adding a site to the VPN, each connected pair of CEs is assigned with a different RT value. As shown in FIG. 4, there is a VPN with three sites, and the three CEs are connected with each other; three PEs assign VRFs with different RT attributes to the three CEs respectively. Specifically, the assigning scheme includes three parts:

1. PE1 assigns import 100:1 and export 100:2 to CE1 and PE2 assigns import 100:2 and export 100:1 to CE2 so that CE1 and CE2 have a direct connection;

2. PE1 assigns import 100:3 and export 100:4 to CE1 and PE3 assigns import 100:4 and export 100:3 to CE3 so that CE1 and CE3 have a direct connection;

3. PE2 assigns import 100:6 and export 100:5 to CE2 and PE3 assigns import 100:5 and export 100:6 to CE3 so that CE2 and CE3 have a direct connection.

However, with the above assigning approach adopted, the number of RT attribute values in a VRF will increase along with the increase number of sites. Moreover, as assigning of RT values is not properly associated with the VPN, the network manager, upon obtaining the RT values in the network, can only learn the connections between CEs, but cannot determine whether the CEs having connections with each other belongs to the same VPN. For example, in FIG. 4, the network manager can identify that there are connections between CE1 and CE2, CE2 and CE3, CE1 and CE3, but it is impossible to determine whether the three CEs: CE1, CE2 and CE3 belong to the same VPN.

To solve the problem discussed above, a CE Route Community (CERC) concept is put forward. A VPN usually consists of several CERCs. But the simplest situation is that one VPN has only one CERC. Based on the concept of CERC, two networking models are put forward for a VPN consisting of a plurality of sites: the Full Mesh model and the Hub Spoke model. In the Full Mesh model of CERC, as shown in FIG. 5, every two CEs are in connection while in the Hub Spoke model, as shown in FIG. 6, the Hub CE is in connection with all other CEs, but the Spoke CE is only in connection with the Hub CE. The CERC of Full Mesh model may be considered as a special case of the Hub Spoke model CERC, in which every CE is a Hub CE.

The network manager assigns two different RT values to each CERC: one for Hub RT and one for Spoke RT. When a new CE joins the CERC, it can be assigned an RT table according to its type, i.e. the Hub CE or the Spoke CE. For a Hub CE, the assigned RT table contains import hub RT, import spoke RT and export hub RT while for a Spoke CE, the assigned RT table contains import hub RT and export spoke RT.

FIG. 5 and FIG. 6 show a VPN with three sites. FIG. 5 shows a Full Mesh model CERC and FIG. 6 shows a Hub Spoke model CERC.

In the prior art, a network manager assigns an RT table in the order as follows: first, defines a VPN; secondly, defines a CERC in the VPN and assigns two RT values to the CERC; thirdly, makes the customer add CEs to the defined CERC by other means, then an RT table for the CEs is obtained. By dividing a VPN into CERCs and assigning RTs with the help of CERC, the VPN can be well associated with the RT. Nevertheless, there is so far no method put forward, by products or in articles, for making a reverse deduction: when the RT table assigned to a CE is known, how to determine which CERC the CE belongs to and whether the CE is a Hub CE or a Spoke CE in the CERC.

SUMMARY OF THE INVENTION

In view of the above description, the object of the invention is to propose a method to determine the relationship between CEs and the VPN so that the relationship between CEs and CERCs and type of CEs in CERCs can be determined through reverse deduction based on the known RT tables in the network, thereby the VPN information can be learned from the network manager, hence, less human effort is involved, and the cost of network maintenance is greatly reduced.

To achieve the above object, the invention is implemented with the following scheme.

A method for determining the relationship of a CE with a VPN, comprising: assigning for each CE device at least one RT value to form an RT table of the CE; and assigning for at least one created CERC a Hub RT value and a Spoke RT value, respectively, wherein the method further comprises the following steps:

a. Dividing the RT table of the current CE to be matched with the designated CERC into an import RT table and an export RT table based on the import or export attribute of RT values therein;

b. Determining the home attribute of the said CE according to the RT values in the import and export RT tables obtained in Step a as well as the Hub RT value and Spoke RT value assigned to the designated CERC;

Wherein determining the home attribute of the current CE to be matched in Step b refers to determining whether the said CE belongs to the designated CERC and of which type the said CE is in the designated CERC: a Hub CE or a Spoke CE. Thus, Step b further comprises:

b1. Determining whether the Hub RT value and Spoke RT value of the designated CERC are in the import RT table of the current CE and whether the Hub RT value of the said CERC is in the export RT table of the said CE; if both exist, the said CE is a Hub CE in the designated CERC; otherwise, going to Step b2;

b2. Determining whether the Hub RT value of the designated CERC is in the import RT table of the current CE to be matched, and whether the Spoke RT value of the designated CERC is in the export RT table of the said CE; if both exist, the said CE is a Spoke CE in the CERC; otherwise, the said CE to be matched does not belong to the designated CERC.

The method further comprises: before the CERC is assigned with the Hub RT value and Spoke RT value, obtaining RT values of all CEs from the network; then creating a VPN and dividing the created VPN into CERCs.

Therefore, the method provided by the invention is to make a reverse deduction under the conditions that RT tables have been assigned to CEs in the network, to determine the relationship between a CE and a CERC and whether the CE is a Hub CE or a Spoke CE so that relationship of the CE with a VPN is learned. Usually, during normal networking, the network is manually debugged and services manually tested before the network manager takes charge of service distribution and network management. This conventional procedure is in the reverse order of operation proposed by this invention where a VPN is first defined, then a CERC is defined before a CE is added to the CERC. With the conventional procedure, the data should be inputted by the network manager according to the information manually configured before, which wastes time and is error-prone. With the procedure of the present invention, as long as RTs are assigned in line with the concept of CERC, the relationship between existing VPNs and CEs in the network will be recognized without the need of inputting much information by the network manager so as to find the VPN information, reduce error rate of configuration, save time, and lower the maintenance cost.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The invention will be described in more detail with reference to the accompanying drawings and embodiments.

In this invention, the procedure of adding CEs to the CERC is implemented as follows: first, one or more RT values are assigned to each CE device; secondly, the network manager obtains all the RT values of the network; thirdly, the network manager creates a VPN, and then creates CERCs on the created VPN, i.e. dividing the VPN into several CERCs; finally, after CERCs have been created, CEs are added to different CERCs through an identifying algorithm to implement the automatic identification of VPN information.

In the above procedure of adding CEs, the method for assigning RT values to CE devices and method for obtaining all the RT values of the network are techniques disclosed in the prior art; only the process of adding CEs to the designated CERC, i.e. the above-mentioned identifying algorithm, is different from the prior art.

Figure 7:
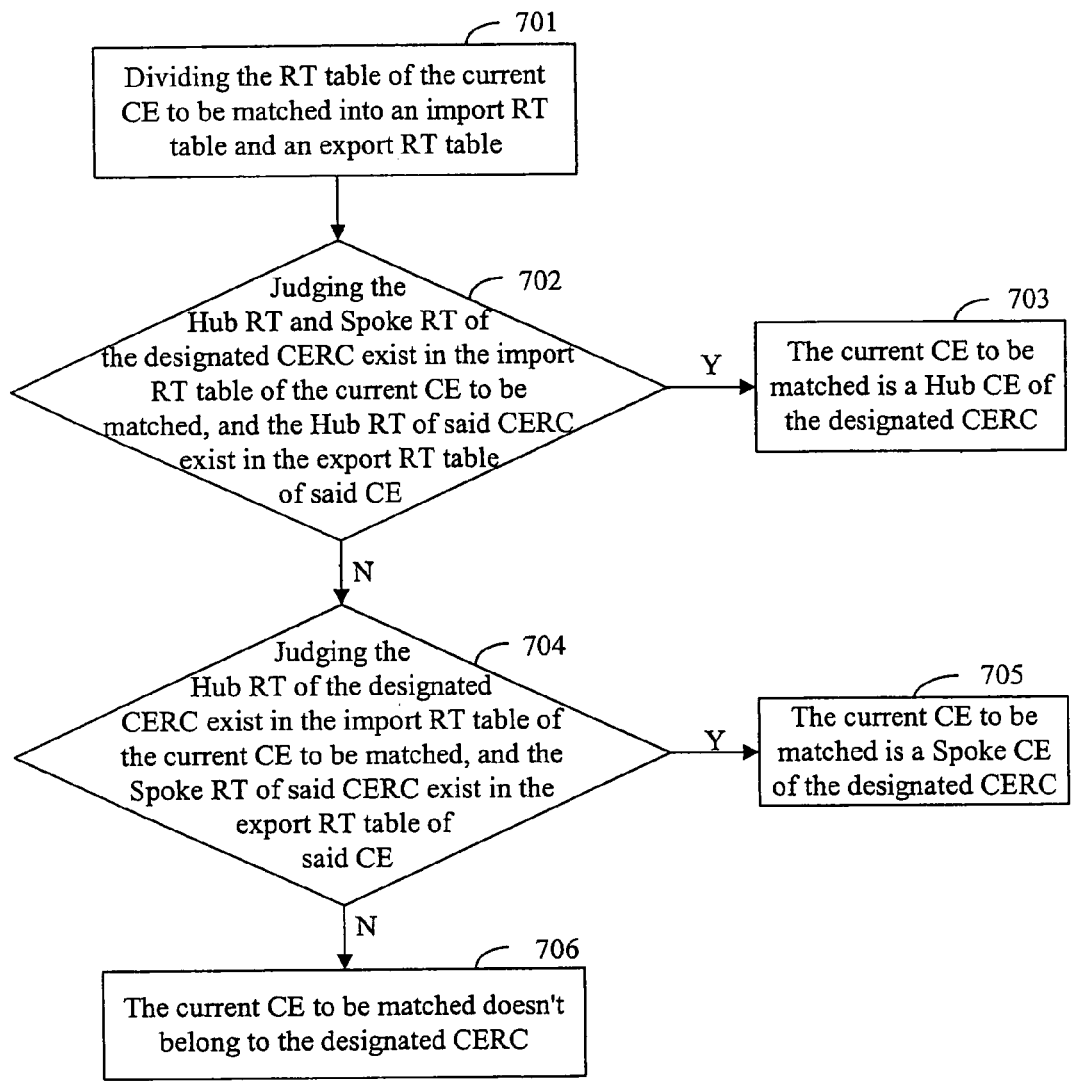
FIG. 7 is the flowchart of the invention.

In this invention, the procedure of matching a CE to the designated CERC based on the RT values, i.e. the process in which the network manager matches a CE based on the created CERCs and the known RT table to determine whether the CE belongs to the designated CERC and whether the CE is a Hub CE or a Spoke CE in the designated CERC, as shown in FIG. 7, comprises the following steps:

Step 701: Dividing the RT table of the current CE to be matched with the designated CERC into an import RT table and an export RT table in accordance with the import/export attribute of the RT values in the RT table.

Step 702 to Step 706 For each designated CERC, determining whether the current CE to be matched with the designated CERC is a Hub CE or a Spoke CE of the designated CERC according to the RT values in the import RT table and export RT table, obtained in Step 701, as well as the Hub RT value and Spoke RT value assigned for the designated CERC since each CERC has been assigned a Hub RT value and a Spoke value during creation.

Specifically, the determining process is as follows:

a. Determining first whether the Hub RT value and Spoke RT value of the designated CERC exists in the import RT table of the CE to be matched and whether the Hub RT value of the designated CERC exists in the export RT table of the CE to be matched, if both exist, confirming that the current CE to be matched is a Hub CE in the designated CERC; otherwise, going to Step b;

b. If the current CE to be matched is not a Hub CE of the designated CERC, determining then whether the Hub RT value of the designated CERC exists in the import RT table of the CE, and whether the Spoke RT value of the designated CERC exists in the export RT table of the CE; if both exist, confirming that the CE is a Spoke CE in the designated CERC; otherwise, assuming that the current CE to be matched does not belong to the designated CERC.

In this way, the relationship between the current CE to be matched and the designated CERC is learned, that is, it is learned whether the CE belongs to the designated CERC, and of which type the CE is in the CERC.

The procedure mentioned above is to add one CE to one CERC. Perform the steps 701 to 706 repeatedly for every CERC and the relationship between a current CE to be matched and each CERC as well as the type of the said CE in each CERC to which the said CE belongs will be learned. Or Designate a CERC, perform the steps 701 to 706 repeatedly for each CE and the relationship of each CE with the designated CERC will be learned.

Figure 1:
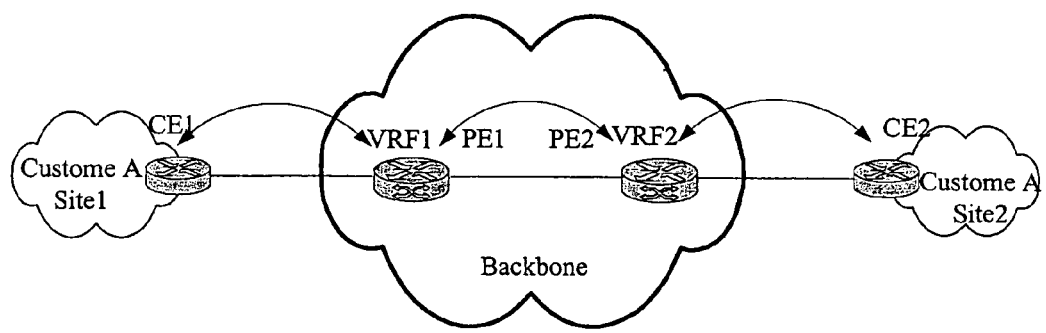
FIG. 1 shows an embodiment of routing information exchange in a VPN.
Figure 2:
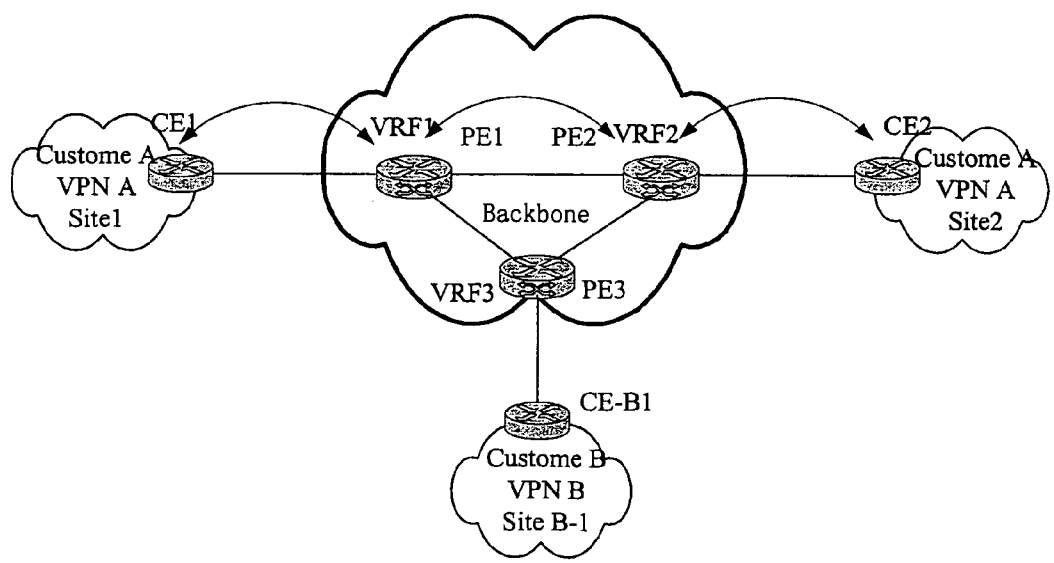
FIG. 2 shows another embodiment of routing information exchange in a VPN.
Figure 3:
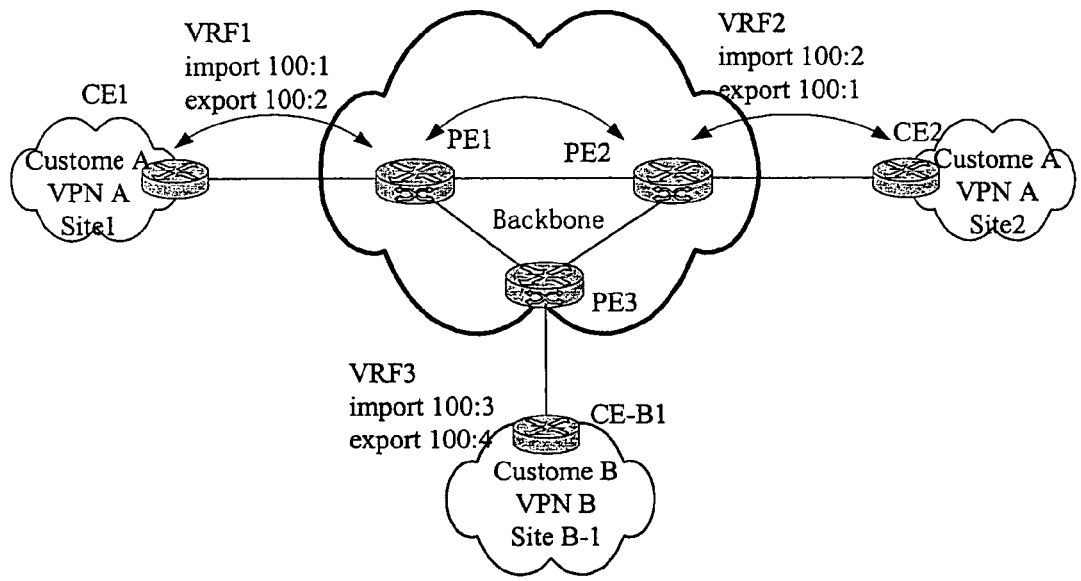
FIG. 3 shows a third embodiment of routing information exchange in a VPN.
Figure 4:
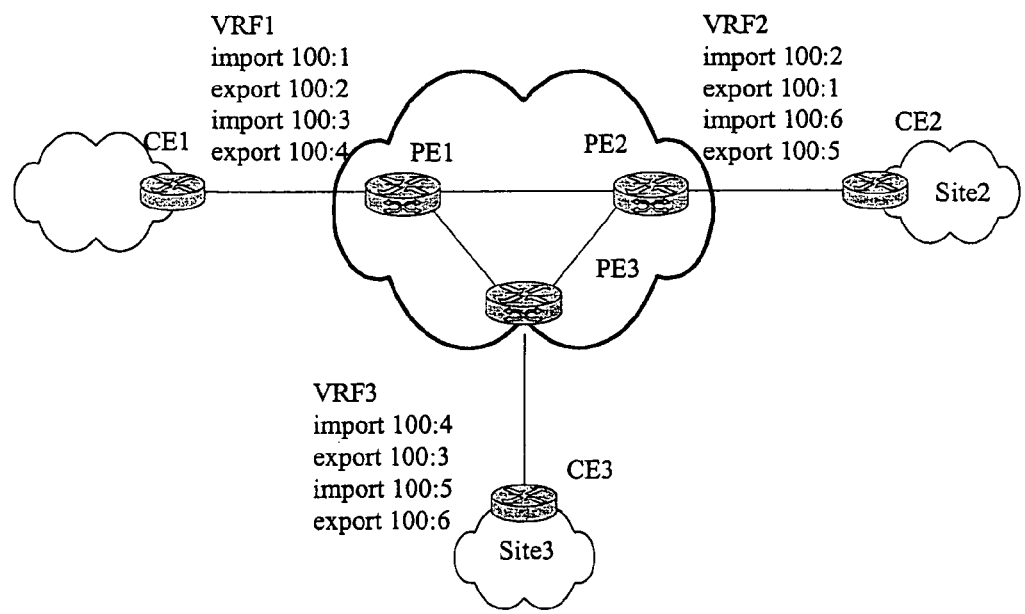
FIG. 4 illustrates a simple approach for assigning RTs in a VPN.
Figure 5:
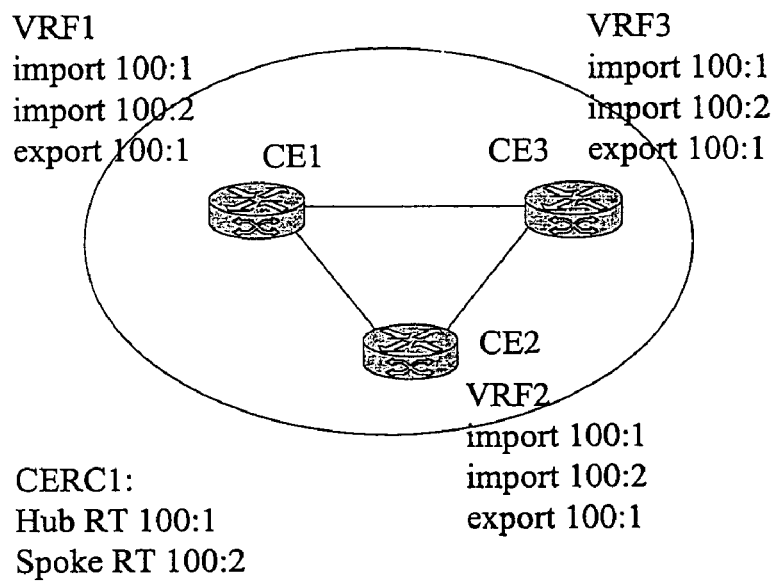
FIG. 5 illustrates the approach for assigning RTs to a CERC of Full Mesh type in a VPN.
Figure 6:
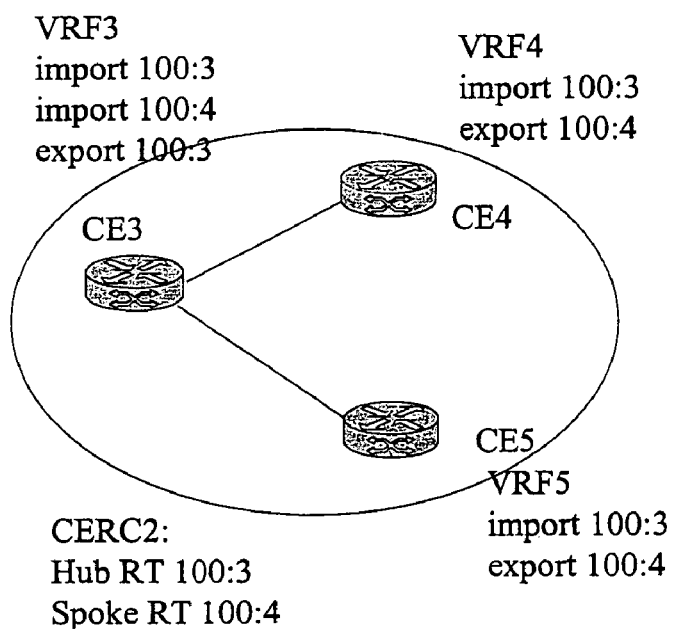
FIG. 6 illustrates the approach for assigning RTs to a CERC of Hub Spoke type in a VPN.

FIG. 6 shows an example; in this example the current CE to be matched is CE3, and the CERC shown in the figure is CERC2. When the relationship between the CE3 and CERC2 is unknown, the implementation of the invention is as follows:

1. CE3 has been assigned the import RT values 100:3 and 100:4, the export RT value 100:3, so the RT table of CE3 has three RT values;

CE4 has been assigned the import RT value 100:3, the export RT value 100:4, so the RT table of CE4 has two RT values;

CE5 has been assigned the import RT value 100:3, the export RT value 100:4, so the RT table of CE5 has two RT values;

The created CERC2 is assigned the Hub RT value 100:3 and the Spoke RT value 100:4.

2. The RT table of CE3 is divided into the import RT table with values 100:3 and 100:4 and the export RT table with value 100:3.

3. Since the Hub RT value 100:3 and Spoke RT value 100:4 of CERC2 are both in the import RT table of CE3, and the Hub RT value of CERC2 is in the export RT table of the CE3, CE3 belongs to CERC2 and is a Hub CE in CERC2.

In this way, it will be known from the network manager which CERCs and VPNs a CE has been added to, whereas it is known which CEs a VPN has and how the CEs are connected with each other, thereby it is possible to learn the VPN information from the service network manager of VPN.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for determining the relationship of a first Customer Edge Router (CE) with a Virtual Private Network (VPN), comprising: assigning in advance at least one Route Target (RT) value for each CE device in a network to form an RT table of that CE and assigning a Hub RT value and a Spoke RT value for each of more than one created CE Route Community (CERC), wherein the method further comprises the following a). dividing the RT table of the first CE to be matched with a designated CERC into an import RT table and an export RT table based on the import and export attributes of the RT values in the RT table;

b). determining whether the first CE belongs to the designated CERC, and whether the first CE is a Hub CE or a Spoke CE in the designated CERC based on the RT values in the import RT table and the export RT table obtained in a) as well as the Hub RT value and the Spoke RT value assigned to the designated CERC.

2. The method according to claim 1, wherein b) comprises:

b1). determining whether the Hub RT value and the Spoke RT value of the designated CERC exist in the import RT table of the first CE to be matched, and whether the Hub RT value of the designated CERC exists in the export RT table of the first CE; if both exist, the first CE being a Hub CE in the designated CERC; otherwise, going to b2);

b2). determining whether the Hub RT value of the designated CERC exists in the import RT table of the first CE and whether the Spoke RT value of the designated CERC exists in the export RT table of the first CE; if both exist, the first CE being a Spoke CE in the designated CERC; otherwise, the first CE not belonging to the designated CERC.

3. The method according to claim 1, further comprising: before the Hub RT values and the Spoke RT values are assigned to the CERCs, obtaining the RT values of all the CEs in the network; then creating the VPN, and dividing the VPN into the CERCs.

* * * * *

UNITED STATES PATENT AND TRADEMARK OFFICE
CERTIFICATE OF CORRECTION

| | | |
|---|---|---|
| PATENT NO. | : 7,613,130 B2 | Page 1 of 1 |
| APPLICATION NO. | : 11/184727 | |
| DATED | : November 3, 2009 | |
| INVENTOR(S) | : Bin Huang | |

It is certified that error appears in the above-identified patent and that said Letters Patent is hereby corrected as shown below:

In the Title Page

Item (56); References Cited; Foreign Patent Documents; IDS filed 11/28/05, Foreign Patent Documents, 2nd row: "JP 200220894 A" should be --JP 2002208946 A--.

Signed and Sealed this

Fifth Day of January, 2010

David J. Kappos
*Director of the United States Patent and Trademark Office*

UNITED STATES PATENT AND TRADEMARK OFFICE
CERTIFICATE OF CORRECTION

PATENT NO.       : 7,613,130 B2                                   Page 1 of 1
APPLICATION NO.  : 11/184727
DATED            : November 3, 2009
INVENTOR(S)      : Bin Huang It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1141 days.

Signed and Sealed this

Nineteenth Day of October, 2010

David J. Kappos
*Director of the United States Patent and Trademark Office*